US012703579B2

(12) United States Patent
Krell

(10) Patent No.: US 12,703,579 B2
(45) Date of Patent: Aug. 11, 2026

(54) APPARATUS AND METHOD FOR PROCESSING A WORKPIECE

(71) Applicant: MS Ultraschall Technologie GmbH, Spaichingen (DE)

(72) Inventor: Volker Krell, Neuhausen ob Eck (DE)

(73) Assignee: MS Ultraschall Technologie GmbH, Spaichingen (DE)

(*) Notice: Subject to any disclaimer, the term of this patent is extended or adjusted under 35 U.S.C. 154(b) by 186 days.

(21) Appl. No.: 18/697,990

(22) PCT Filed: Sep. 2, 2022

(86) PCT No.: PCT/EP2022/074446
§ 371 (c)(1),
(2) Date: Apr. 2, 2024

(87) PCT Pub. No.: WO2023/061661
PCT Pub. Date: Apr. 20, 2023

(65) Prior Publication Data

US 2024/0400317 A1 Dec. 5, 2024

(30) Foreign Application Priority Data

Oct. 15, 2021 (DE) ......................... 102021126774.9

(51) Int. Cl.
*B65G 47/74* (2006.01)
*B29C 65/00* (2006.01)
(Continued)

(52) U.S. Cl.
CPC .......... *B65G 47/74* (2013.01); *B29C 65/7894* (2013.01); *B29C 66/9221* (2013.01); *B29C 66/92431* (2013.01); *B29C 65/08* (2013.01)

(58) Field of Classification Search
CPC . B65G 47/74; B29C 65/7894; B29C 66/9221; B29C 66/92431; B29C 65/08;
(Continued)

(56) References Cited

U.S. PATENT DOCUMENTS 2,393,696 A * 1/1946 Kraut ...................... B23B 39/02 29/29
2,534,593 A * 12/1950 Hacklander ......... B29C 66/8221 219/775
(Continued)

FOREIGN PATENT DOCUMENTS

DE 2406635 A1 11/1974
DE 19753740 C1 7/1999
(Continued)

OTHER PUBLICATIONS

Parrini, L. (2001). Design of advanced ultrasonic transducers for welding devices. IEEE transactions on ultrasonics, ferroelectrics, and frequency control, 48(6), 1632-1639. (Year: 2001).*
(Continued)

*Primary Examiner* — John S. Wasaff
(74) *Attorney, Agent, or Firm* — Dickinson Wright PLLC

(57) ABSTRACT

An apparatus for processing a workpiece with ultrasound comprises a base frame having a slide. A tool holder is connected to the slide via leaf springs, whereby a lifting device can move the tool holder relative to the slide.

17 Claims, 4 Drawing Sheets

Figure 1:
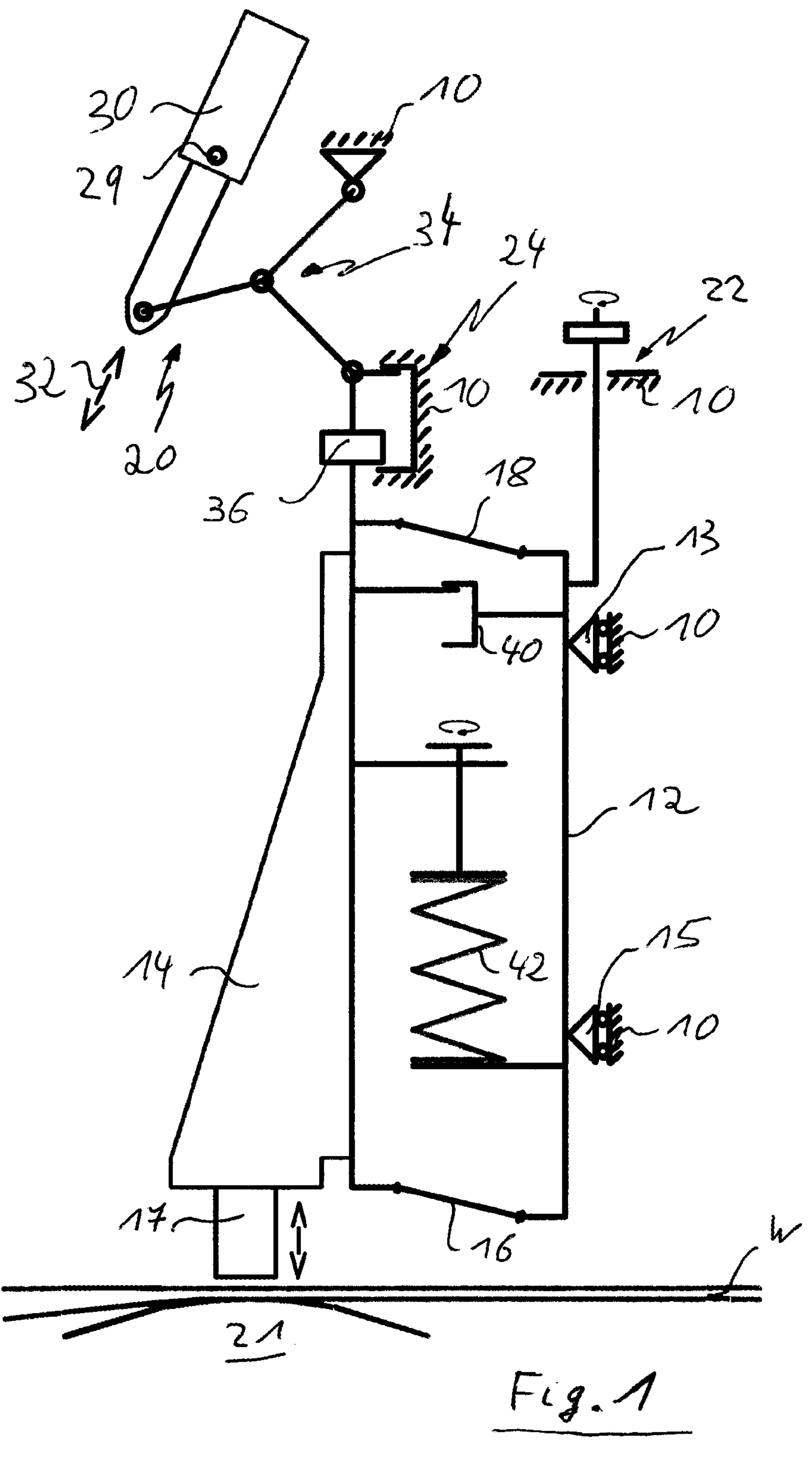

(51) Int. Cl.
*B29C 65/08* (2006.01)
*B29C 65/78* (2006.01)

(58) Field of Classification Search
CPC ............... B29C 66/41; B29C 66/92611; B29C 66/92653; B29C 66/83411; B29C 65/086; B29C 66/1122; B29C 66/8161; B29C 66/92651; B29C 66/92655; B29C 66/961
See application file for complete search history.

(56) References Cited

U.S. PATENT DOCUMENTS

| | | | | |
|---|---|---|---|---|
| 3,863,826 A | 2/1975 | Shoh | | |
| 4,467,160 A * | 8/1984 | Murmann | H01H 13/12 200/536 |
| 5,116,234 A * | 5/1992 | Bertz | G01B 5/004 33/783 |
| 6,190,296 B1 | 2/2001 | Gnad | | |
| 2013/0263999 A1* | 10/2013 | Weiland | B23K 20/106 156/538 |
| 2017/0102685 A1* | 4/2017 | Kitakaze | B23B 25/02 |
| 2017/0232660 A1* | 8/2017 | Raszillier | B23K 37/0229 156/350 |
| 2018/0243834 A1* | 8/2018 | Sannomiya | B23Q 15/013 |

FOREIGN PATENT DOCUMENTS

| | | | |
|---|---|---|---|
| DE | 10331064 A1 | 2/2005 | |
| DE | 102014102685 A1 | 9/2015 | |
| DE | 102016102164 A1 | 8/2017 | |
| DE | 102021116526 A1 * | 12/2022 | B26D 5/00 |
| WO | WO-2014071901 A1 * | 5/2014 | B29C 66/242 |

OTHER PUBLICATIONS

Parrini, L. (2003). New techniques for the design of advanced ultrasonic transducers for wire bonding. IEEE transactions on electronics packaging manufacturing, 26(1), 37-45. (Year: 2003).*

Search Report corresponding to DE102021126774.9 dated Mar. 25, 2022, 8 pages.

Translation of International Search Report corresponding to PCT/EP2022/074446 dated Feb. 2, 2023, 22 pages.

* cited by examiner 29
10
20
20
70
24
22
10
36
18
10
12
14
42
10
17
16
W
M
21

30
29
10
24
31
22
36
40
12
42
14
33
W
17
M
21

30
29
20
35
22
36
12
14
10
37
W
M
17
21

APPARATUS AND METHOD FOR PROCESSING A WORKPIECE

CROSS-REFERENCES TO RELATED APPLICATIONS

This application is a National Stage of International Application No. PCT/EP2022/074446, filed on Sep. 2, 2022, which claims the benefit of German Application No. 102021126774.9, filed on Oct. 15, 2021. The entire disclosures of the applications referenced above are incorporated herein by reference.

The present invention relates to an apparatus for processing a workpiece with ultrasound, for example for processing a material web with a sonotrode. The problem here is that the workpiece, for example the material web, is subject to thickness fluctuations or that changes occur in the spacing between the tool and the counter tool due to temperature fluctuations of the apparatus so that the spacing of the processing tool, for example the sonotrode, relative to the workpiece or the counter tool must be changed.

It is known from the prior art to arrange the tool on a slide that feeds the tool in the direction of the workpiece by means of a force-controlled lifting device and varies the spacing from the workpiece (cf. DE 197 53 740 C1). It is also known from the prior art to connect a tool holder for a sonotrode to a base frame via two leaf springs (cf. DE 103 31 064 A1).

It is the object of the present invention to provide an apparatus and a method for processing a workpiece with which a processing of workpieces of varying thickness is possible in a structurally simple manner.

This object is satisfied by the features of the independent claims and in particular by an apparatus that comprises a base frame having a slide that is linearly displaceable on the base frame, wherein a tool holder is provided that is movable relative to the slide and that is connected to the slide via two parallel leaf springs. A lifting device is provided for moving the tool holder relative to the slide and is arranged between the base frame and the tool holder.

According to the invention, only a single lifting device is thus provided that is supported directly at the base frame and that can both move the slide into a working position and move the tool holder relative to the slide to vary the spacing of the tool from the workpiece when the slide is fixed or blocked. The slide can hereby be moved by a comparatively large feeding stroke by means of a single lifting device, while a precise working stroke of the tool holder is possible with the same lifting device. Said working stroke can be achieved by using relatively stiff leaf springs with which indeed only a small stroke is possible, but is possible with a high accuracy and a high repeatability. Since the slide is blocked or fixed during the working stroke, it is only subject to minimal wear.

Advantageous embodiments are described in the description, in the drawing, and in the dependent claims.

According to a first advantageous embodiment, a positive abutment, in particular an adjustable positive abutment, for the slide can be provided at the base frame so that the slide can be fed in the direction of the workpiece by the lifting device until the slide abuts the positive abutment.

According to a further advantageous embodiment, the stroke of the lifting device can comprise a feeding stroke and a working stroke, with the feeding stroke moving the slide up to the positive abutment and the working stroke moving the tool holder relative to the slide when the slide abuts the positive abutment. In this way, a movement of the tool holder towards and away from the workpiece is still possible with one and the same lifting device after the slide can no longer move due to the abutting at the positive abutment. The possibility is hereby provided of making the feeding stroke comparatively large so that the tool can be retracted and then returned to a working position, for example during a material change. The working stroke enables a setting, for example a force-regulated setting, of the spacing between the tool and a counter tool in a working position of the tool.

According to a further advantageous embodiment, a positive abutment for the tool holder can be provided at the base frame. This positive abutment can, for example, comprise an upper and a lower abutment so that the lifting device can be moved into an upper reference position, on the one hand, and into a lower end position, on the other.

According to a further advantageous embodiment, the lifting device can have a toggle lever mechanism and/or a spindle drive to feed the tool holder in the direction of a counter tool in a controlled manner.

According to a further advantageous embodiment, the lifting device can have a force sensor that detects the force applied to a workpiece by the tool in order to thereby control the lifting device so that the tool is fed with a constant force in the direction of the counter tool.

According to a further advantageous embodiment, a stroke limitation can be provided for the leaf springs so that they can only be deflected within a limited range.

According to a further advantageous embodiment, the two leaf springs can in particular be preloaded against one another in a settable manner. The tool holder can hereby be preloaded relative to the slide towards the lifting device, whereby a lifting movement of the tool holder towards the workpiece and away from the workpiece is possible by means of the lifting device even when the slide abuts the positive abutment.

According to a further advantageous embodiment, the slide and the tool holder can be connected to one another via an elastic element. The slide and the tool holder can hereby be connected to one another so that they can be displaced together by the lifting device, wherein, however, a movement of the tool holder relative to the slide is nevertheless possible when the slide abuts the positive abutment if the elasticity of the elastic element is selected appropriately.

According to a further advantageous embodiment, the working stroke can amount to approximately 5 to 15%, in particular approximately 8 to 12%, in particular approximately 10% of the feeding stroke. The tool can hereby be moved relatively far away from a counter tool, for example for a material change. At the same time, a sensitive setting of the gap width between the tool and counter tool can be made in the working position of the tool.

In the method according to the invention for processing a workpiece using an apparatus of the above-described kind, the slide is first moved by a feeding stroke by the lifting device, in particular up to a positive abutment, whereupon the lifting device then moves the tool holder relative to the slide within a working stroke, in particular in dependence on a force applied to the workpiece by the lifting device.

Here, it can be advantageous, for setting up the apparatus, to adjust the two leaf springs between the two aforementioned steps so that they are located on two planes that are spaced apart in parallel and that are not curved. This creates an ideal working position that makes it possible during operation to move the tool holder in a force-controlled manner towards and away from the counter tool as part of the working stroke.

The present invention will be described in the following purely by way of example with reference to an advantageous embodiment and to the enclosed drawings.

Figure 2:
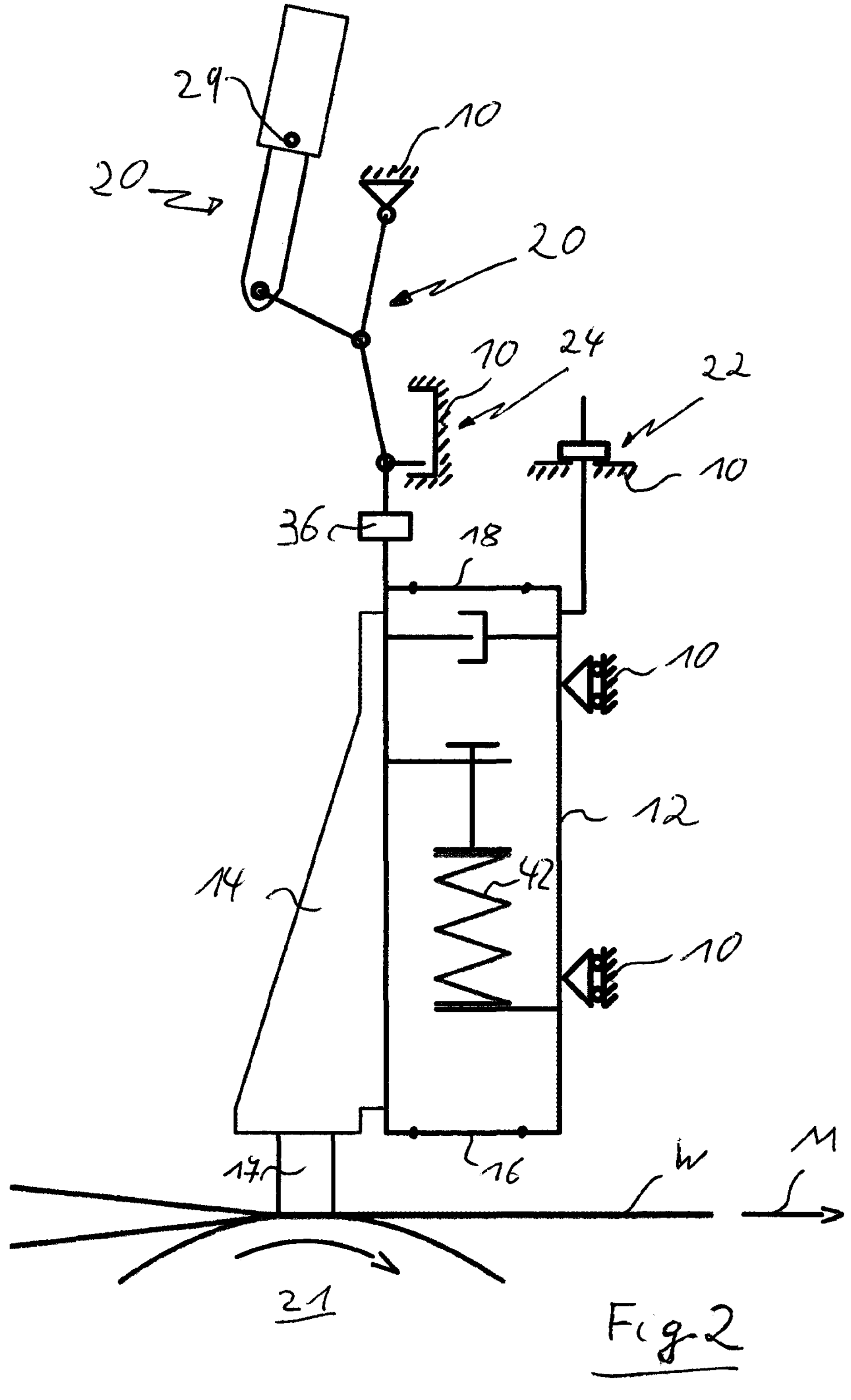
Figure 3:
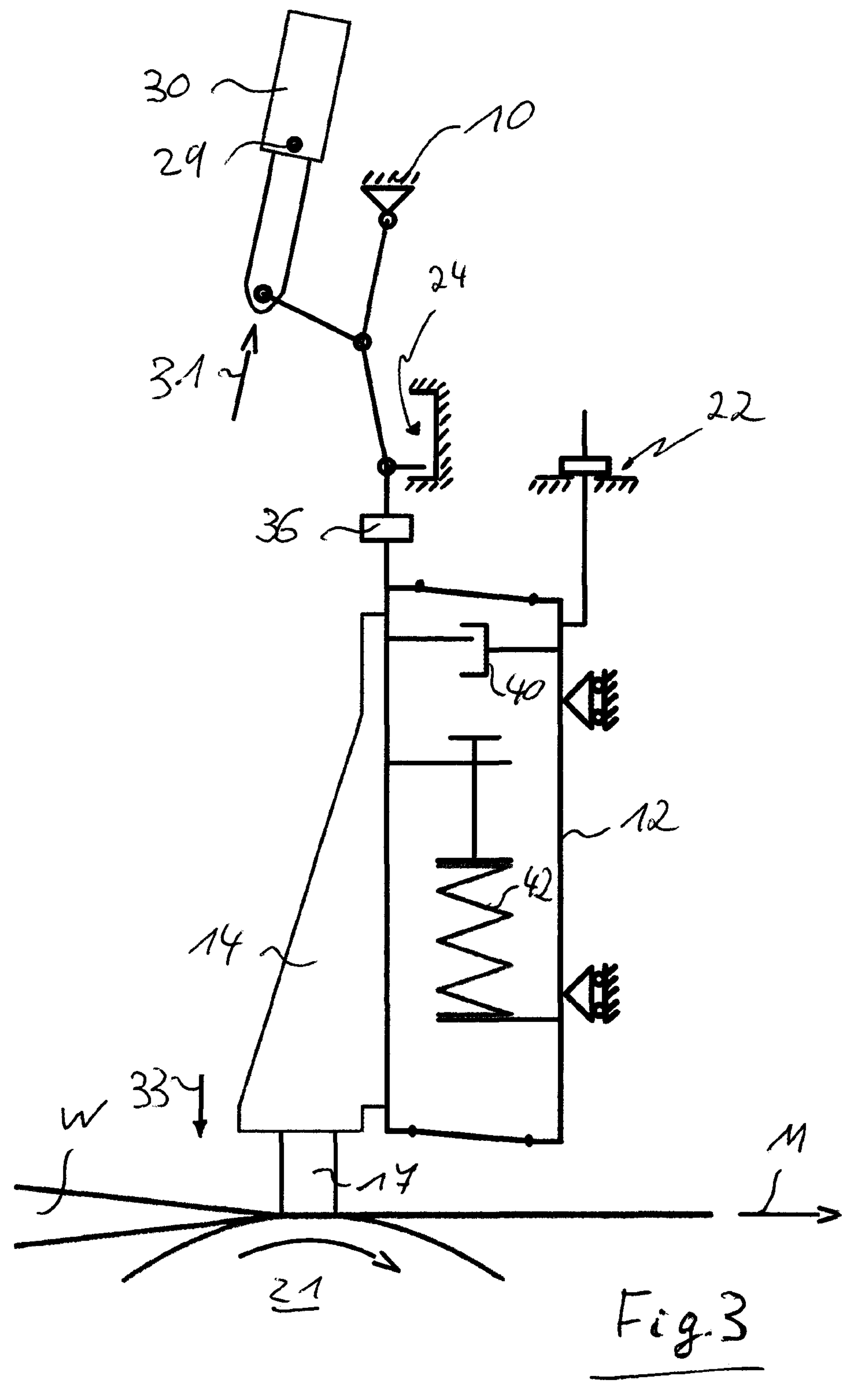
Figure 4:
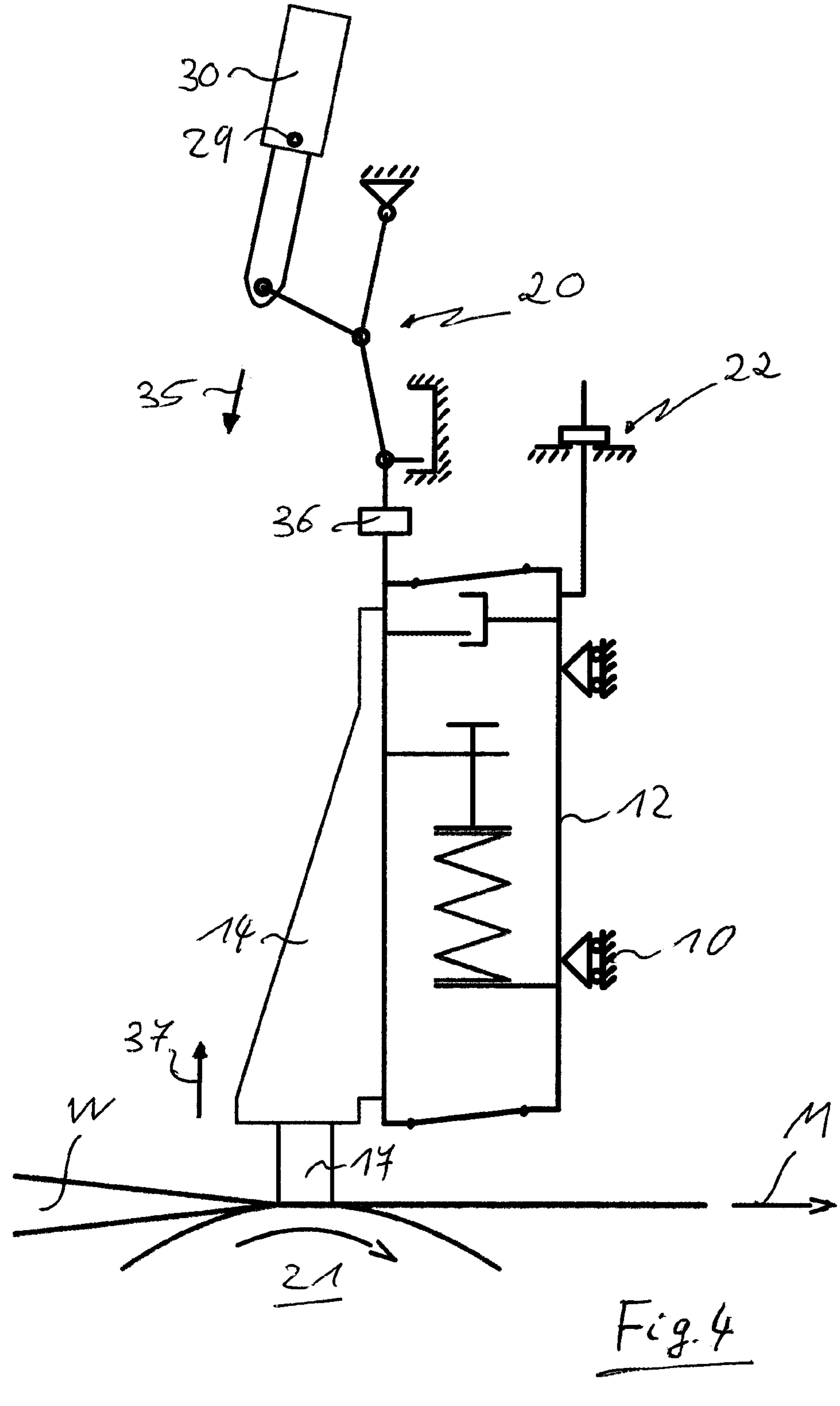

There are shown:

FIG. 1 a highly schematic representation of an apparatus for processing a workpiece in a base position;

FIG. 2 the apparatus of FIG. 1 in a working position;

FIG. 3 the apparatus of FIG. 1 and FIG. 2 in a slightly raised working position; and FIG. 4 the apparatus of FIG. 1 in a slightly lowered working position.

FIG. 1 to FIG. 4 show a highly schematic representation of an apparatus for processing a workpiece W, for example a material web, with ultrasound. The apparatus comprises a base frame 10, not shown in detail, on which a slide 12 is linearly displaceable. The slide 12 is supported at the base frame 10 via two plain bearings, for example two revolving roller bearings 13 and 15, so that it can be displaced in a vertical direction (in the embodiment shown). It is understood that the apparatus described can also be arranged in other orientations, for example so that the slide is arranged horizontally or in an inclined manner.

Furthermore, a tool holder 14 movable relative to the slide 12 is provided at which a tool, for example a sonotrode 17, is arranged. The workpiece W can be processed by means of the sonotrode 17, for example, two material webs can be welded together by feeding the tool or the sonotrode 17 towards a counter tool 21, for example a rotatable anvil, and setting it into operation.

The slide 12 is connected to the tool holder 14 via two parallel leaf springs 16 and 18 so that the tool holder 14 can be moved in parallel relative to the slide 12.

To move both the slide 12 and the tool holder 14, a lifting device 20 is provided whose one end is fastened to the base frame 10 and whose other end is fastened to the tool holder 14. The lifting device 20 is arranged between the base frame 10 and the tool holder 14 and causes a lifting movement of the tool holder 14 relative to the slide 12 when the slide 12 is fixed or stopped. The lifting device 20 comprises a drive 30, for example a spindle drive, that is supported in an articulated manner via a joint 29, that can be moved in the direction of the double arrow 32 and that, during its movement, moves a toggle lever joint 34, which is supported relative to the base frame 10, so that the tool holder 14 and the slide 12 connected thereto via the leaf springs 16 and 18 can be moved upwards or downwards in the vertical direction when the slide 12 is not fixed.

As the Figures furthermore show, a stop is provided at the base frame 10, for example, a positive abutment 22 for the slide 12 that is adjustable and that fixes the slide at least in one direction of movement or blocks a vertical movement of the slide 12 towards the counter tool 21. Furthermore, the apparatus comprises, at the base frame 10, a stop, for example a positive abutment 24 for the tool holder 14, wherein the positive abutment 24 can comprise an upper reference abutment and a lower end abutment and wherein the latter can be located shortly before the dead center of the toggle lever joint 34. A force sensor 36 can also be provided between the toggle lever joint 34 and the tool holder 14 and is connected to a control (not shown) that controls the drive 30 in dependence on the detected force so that the tool 17 is fed towards the counter tool 21 with a desired force, for example a constant force.

The apparatus can furthermore have a stroke limitation 40 for the two leaf springs 16 and 18 that ensures that the two leaf springs can only be deflected within a limited range. A preload of the two leaf springs 16 and 18 can be achieved by a spring 42 that is provided between the slide 12 and the tool holder 14. The preload can be settable and can be selected so that the tool holder 14 is preloaded against the slide 12 towards the lifting device 20, i.e. is preloaded away from the workpiece W or the counter tool 21.

Furthermore, the slide 12 can be connected to the tool holder 14 via an elastic element (not shown) so that the slide and the tool holder can indeed be moved together by the lifting device 20, but a certain movement of the tool holder 14 relative to the slide 12 is still possible when the slide 12 abuts the positive abutment 22.

With the above-described apparatus, the tool 17 can first be moved by a relatively large feeding stroke and then by a relatively small working stroke by means of the lifting device 20. By actuating the drive 30, the toggle lever joint 34 can be moved such that first the tool holder 14 and, together with it, the slide 12 are moved vertically relative to the base frame 10 towards the counter tool 21. During this movement, the movement of the slide 12 is, for example, stopped by the positive abutment 22 at the end of the feeding stroke. However, the tool holder 14 can still be moved further relative to the stationary slide 12 since the leaf springs 16 and 18 make this possible.

In the position shown in FIG. 2, the apparatus is in its working position, i.e. the ideal working point is set at which the sonotrode 17 assumes a desired spacing relative to the counter tool 21. When moving a material web in the direction of the arrow M (FIG. 2), tolerances in the material or temperature fluctuations may make it necessary to increase or decrease the gap width. For this purpose, the force sensor 36 measures the force applied to the tool 17 by the lifting device 20 and regulates the movement of the lifting device 20 in dependence on the measured force. The tool holder 14 can here be moved vertically downwards relative to the stationary slide 12 when the toggle lever joint 20 is pushed through further (FIG. 3). Equally, the tool holder 14 can be moved vertically upwards when the toggle lever joint 20 is opened, as shown in FIG. 4.

If, therefore, starting from the ideal working position shown in FIG. 2, the force sensor 36 detects a decrease in the force in the force flow between the tool 17 and the base frame 10, the drive 30 can be retracted in the direction of the arrow 31 so that the tool holder 14 moves vertically downwards in the direction of the arrow 33. However, due to the preload of the spring 42, the slide 12 does not move in this respect. This would only take place if the upper stroke limitation 40 is reached.

Finally, FIG. 4 illustrates a movement of the tool 17 from the ideal working position of FIG. 2 away from the counter tool 21 when the force sensor 36 determines an undesired increase in the detected force. In this case, the drive 30 can be moved in the direction of the arrow 35 so that the tool holder 14 can be moved slightly away from the counter tool 21 in the direction of the arrow 37.

For setting up the above-described apparatus, it can first be moved into the position shown in FIG. 1. In this position, the positive abutment 22 is free and the spring 42 is not preloaded. The slide 12 and the tool holder 14 do not yet have a defined position relative to one another.

In a subsequent first step, an automated measurement of the toggle lever kinematics can take place, for which purpose a complete stroke of the drive 30 from the upper reference abutment up to the lower end abutment of the positive abutment 24 is traveled. Here, both the stroke of the drive 30 and the stroke of the tool 17 can be recorded so that a working position can be defined using a characteristic curve (sonotrode stroke over spindle stroke). In a subsequent step, this working position can be approached to set the relative position between the tool holder 14 and the slide 12. For this purpose, the adjustable positive abutment 22 can be adjusted so that the two leaf springs are in a non-preloaded horizontal position in which they lie on two planes that are spaced apart in parallel and that are not curved (cf. FIG. 2). It is then possible to increase the preload of the spring 42 up to a desired target value.

Due to the set-up process described above, during the work process, the mechanism is in an exact working position from which a movement of the tool holder 14 only takes place as part of a working stroke. The working stroke can be considerably less than the feeding stroke and can, for example, amount to only 10% of the feeding stroke. For example, it is possible to move the tool by approximately 20 mm (feeding stroke) into the working position. The tool can then be moved out of the working position, for example, by +2 mm as part of the working stroke.

The invention claimed is:

1. An apparatus for processing a workpiece with ultrasound, comprising a base frame;

a slide that is linearly displaceable on the base frame;

a tool holder that is movable relative to the slide and that is connected to the slide via two parallel leaf springs; and a lifting device that is arranged between the base frame and the tool holder and that causes a lifting movement of the tool holder relative to the slide, wherein with the lifting device, both the slide can be moved relative to the base frame and, when the slide is fixed, the tool holder can be moved relative to the slide.

2. The apparatus according to claim 1, wherein a stop for the slide is provided at the base frame.

3. The apparatus according to claim 2, wherein the stroke of the lifting device comprises a feeding stroke and a working stroke, with the feeding stroke moving the slide up to the stop and the working stroke moving the tool holder relative to the slide when the slide is stopped.

4. The apparatus according to claim 3, wherein the working stroke amounts to 5-15% of the feeding stroke.

5. The apparatus according to claim 4, wherein the working stroke amounts to 8-12% of the feeding stroke.

6. The apparatus according to claim 2, wherein the stop is an adjustable positive abutment.

7. The apparatus according to claim 1, wherein a positive abutment for the tool holder is provided at the base frame.

8. The apparatus according to claim 1, wherein the lifting device has a toggle lever mechanism and/or a spindle drive.

9. The apparatus according to claim 1, wherein the lifting device has a force sensor.

10. The apparatus according to claim 1, wherein a stroke limitation is provided for the leaf springs.

11. The apparatus according to claim 1, wherein the two leaf springs are preloaded against one another.

12. The apparatus according to claim 1, wherein the slide and the tool holder are connected to one another via an elastic element.

13. The apparatus according to claim 12, wherein the two leaf springs are preloaded against one another in a settable manner.

14. A method for processing a workpiece using an apparatus, the apparatus comprising a base frame; a slide that is linearly displaceable on the base frame; a tool holder that is movable relative to the slide and that is connected to the slide via two parallel leaf springs; and a lifting device that is arranged between the base frame and the tool holder and that causes a lifting movement of the tool holder relative to the slide, wherein with the lifting device, both the slide can be moved relative to the base frame and, when the slide is fixed, the tool holder can be moved relative to the slide, wherein a) the slide is first moved by a feeding stroke by the lifting device, b) the slide is then stopped, and c) the tool holder is moved relative to the slide by the lifting device when the slide is stopped.

15. The method according to claim 14, wherein the tool holder is moved by the lifting device in dependence on a force that is applied to the workpiece by the lifting device.

16. The method according to claim 14, wherein, for setting up the apparatus, the two leaf springs are adjusted between steps a) and b) so that they are located on two planes that are spaced apart in parallel and that are not curved.

17. The method according to claim 16, wherein, after the adjustment, the tool holder is preloaded against the slide in a direction that faces away from the workpiece.

* * * * *